United States Patent
Toriumi

(10) Patent No.: US 11,964,631 B2
(45) Date of Patent: Apr. 23, 2024

(54) DAMPER DEVICE

(71) Applicant: PIOLAX, INC., Kanagawa (JP)

(72) Inventor: Katsuya Toriumi, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 765 days.

(21) Appl. No.: 17/046,400

(22) PCT Filed: Apr. 3, 2019

(86) PCT No.: PCT/JP2019/014819
§ 371 (c)(1),
(2) Date: Oct. 9, 2020

(87) PCT Pub. No.: WO2019/198595
PCT Pub. Date: Oct. 17, 2019

(65) Prior Publication Data
US 2021/0101536 A1 Apr. 8, 2021

(30) Foreign Application Priority Data

Apr. 10, 2018 (JP) .................................. 2018-075283

(51) Int. Cl.
*B60R 7/06* (2006.01)
*F16F 1/373* (2006.01)
(Continued)

(52) U.S. Cl.
CPC .............. *B60R 7/06* (2013.01); *F16F 1/3732* (2013.01); *E05B 83/30* (2013.01); *E05C 21/00* (2013.01); *F16F 7/08* (2013.01)

(58) Field of Classification Search
CPC . B60R 7/06; E05B 83/30; E05B 83/32; E05C 21/00; E05F 5/02; F16F 1/3732; F16F 7/08; F16F 13/00
See application file for complete search history.

(56) References Cited

U.S. PATENT DOCUMENTS 3,752,462 A * 8/1973 Wight, Jr. ................. F16F 7/08
267/140
7,717,239 B2 * 5/2010 Berry, Jr. .................. B60R 7/04
267/37.2
(Continued)

FOREIGN PATENT DOCUMENTS

CN 106382322 A 2/2017
JP H07-293105 A 11/1995
(Continued)

OTHER PUBLICATIONS

Jun. 18, 2019, International Search Report issued for related PCT application No. PCT/JP2019/014819.
(Continued)

*Primary Examiner* — Thomas W Irvin
(74) *Attorney, Agent, or Firm* — Paratus Law Group, PLLC

(57) ABSTRACT

There is provided a damper device including an annular elastic member made of an elastic resin material. One member of a pair of members is provided with a support section for supporting the annular elastic member. The other member of the pair of members is provided with a pair of facing walls between which the support section is to be inserted. The annular elastic member is provided with separated portions that are separated from the outer periphery of the support section. In a state where the annular elastic member is mounted on the outer periphery of the support section, a maximum distance A of the separated portions facing each other is greater than an opening width B between tip ends of the pair of facing walls on a side on which the support section enters.

8 Claims, 16 Drawing Sheets

(51) Int. Cl.
    *F16F 7/08*         (2006.01)
    *E05B 83/30*     (2014.01)
    *E05C 21/00*     (2006.01)

(56)           References Cited

U.S. PATENT DOCUMENTS

| | | | |
|---|---|---|---|
| 9,963,814 B2 * | 5/2018 | Kim | D06F 37/20 |
| 11,293,128 B2 * | 4/2022 | Yang | F16F 15/022 |
| 2014/0305725 A1 * | 10/2014 | Snede | E05F 5/022 |
| | | | 296/193.11 |
| 2017/0362865 A1 * | 12/2017 | Lee | E05F 5/06 |
| 2019/0032388 A1 | 1/2019 | Kato | |
| 2019/0170210 A1 * | 6/2019 | Ohji | B62D 25/06 |

FOREIGN PATENT DOCUMENTS

| | | | |
|---|---|---|---|
| JP | 2010-037748 A | 2/2010 | |
| WO | WO 2017/126400 A1 | 7/2017 | |
| WO | WO 2017/195557 A1 | 11/2017 | |

OTHER PUBLICATIONS

Jun. 18, 2019, International Search Opinion issued for related PCT application No. PCT/JP2019/014819.

* cited by examiner

DAMPER DEVICE

CROSS REFERENCE TO PRIOR APPLICATION

This application is a National Stage Patent Application of PCT International Patent Application No. PCT/JP2019/014819 (filed on Apr. 3, 2019) under 35 U.S.C. § 371, which claims priority to Japanese Patent Application No. 2018-075283 (filed on Apr. 10, 2018), which are all hereby incorporated by reference in their entirety.

TECHNICAL FIELD

The present invention relates to a damper device for applying a damping force when a pair of members move relative to each other.

BACKGROUND ART

For example, the following Patent Literature 1 discloses a lock device for locking opening/closing movement of an opening/closing body attached to a support, the lock device including an operation handle for opening and closing the opening/closing body, a housing fixed to the opening/closing body, a lock member held movably in an inner space of the housing, and a spring for urging the lock member in a protruding direction. A guide groove communicating with the internal space is formed in the housing. Further, a side surface of the lock member is provided with, in a protruding manner, a mounting projection extending along an axial direction of the lock member and having arc-shaped upper and lower ends, and an O-ring is mounted on the mounting projection with the O-ring stretched. The mounting projection on which the O-ring is mounted is fitted into the guide groove of the housing, and when the lock member is moved, an outer periphery of the O-ring is in sliding contact with an inner surface of the guide groove so that a damping force applies to the lock member. Further, in a state where the mounting projection to which the O-ring is mounted is fitted into the guide groove of the housing, the entire inner periphery of the O-ring is in close contact with the entire outer periphery of the mounting projection (see FIG. 8 of Patent Literature 1).

CITATION LIST

Patent Literature

Patent Literature 1: JP-A-2010-37748

SUMMARY OF INVENTION

Technical Problem

In the lock device of Patent Literature 1, as described above, the outer periphery of the O-ring mounted on the outer periphery of the mounting projection of the lock member is in sliding contact in the guide groove of the housing so as to obtain a damping force. However the entire inner periphery of the O-ring is in close contact with the entire outer periphery of the mounting projection, and in order to increase the damping force, increase of a collapse margin of a thickness of the O-ring is required, which may cause insufficient damping force.

Therefore, an object of the present invention is to provide a damper device that can obtain a sufficient damping force with a simple structure using an annular elastic member.

Solution to Problem

In order to achieve the above object, the present invention is a damper device configured to apply a damping force when a pair of members move relative to each other, the damper device including an annular elastic member made of an elastic resin material. One member of the pair of members is provided with a support section for supporting the annular elastic member. The other member of the pair of members is provided with a pair of facing walls between which the support section is to be inserted when the pair of members move relative to each other. The annular elastic member is mounted on an outer periphery of the support section, and in a mounted state, portions of an inner periphery of the annular elastic member, the portions facing each other in a movement direction of the one member or the other member, form contact portions that are in contact with the outer periphery of the support section, and portions of the inner periphery of the annular elastic member, the portions facing each other in a direction perpendicular to the movement direction, are provided with separated portions that are separated from the outer periphery of the support section. In a state where the annular elastic member is mounted on the outer periphery of the support section, a maximum distance A of the separated portions facing each other is greater than an opening width B between tip ends of the pair of facing walls on a side on which the support section enters.

Advantageous Effects of Invention

According to the present invention, in the state where the annular elastic member is mounted on the outer periphery of the support section, the maximum distance A of the separated portions facing each other is greater than the opening width B between the tip ends of the pair of facing walls on the side on which the support section enters. Therefore, when the one member or the other member movers and the support section is inserted between the pair of facing walls, the separated portions of the annular elastic member are pushed by the tip ends of the pair of facing walls so as to be bent and deformed in a narrowed manner, and then pressed against the inner surfaces of the pair of facing walls, so that the damping force for damping the pair of members can be sufficiently obtained.

DESCRIPTION OF EMBODIMENTS

Figure 1:
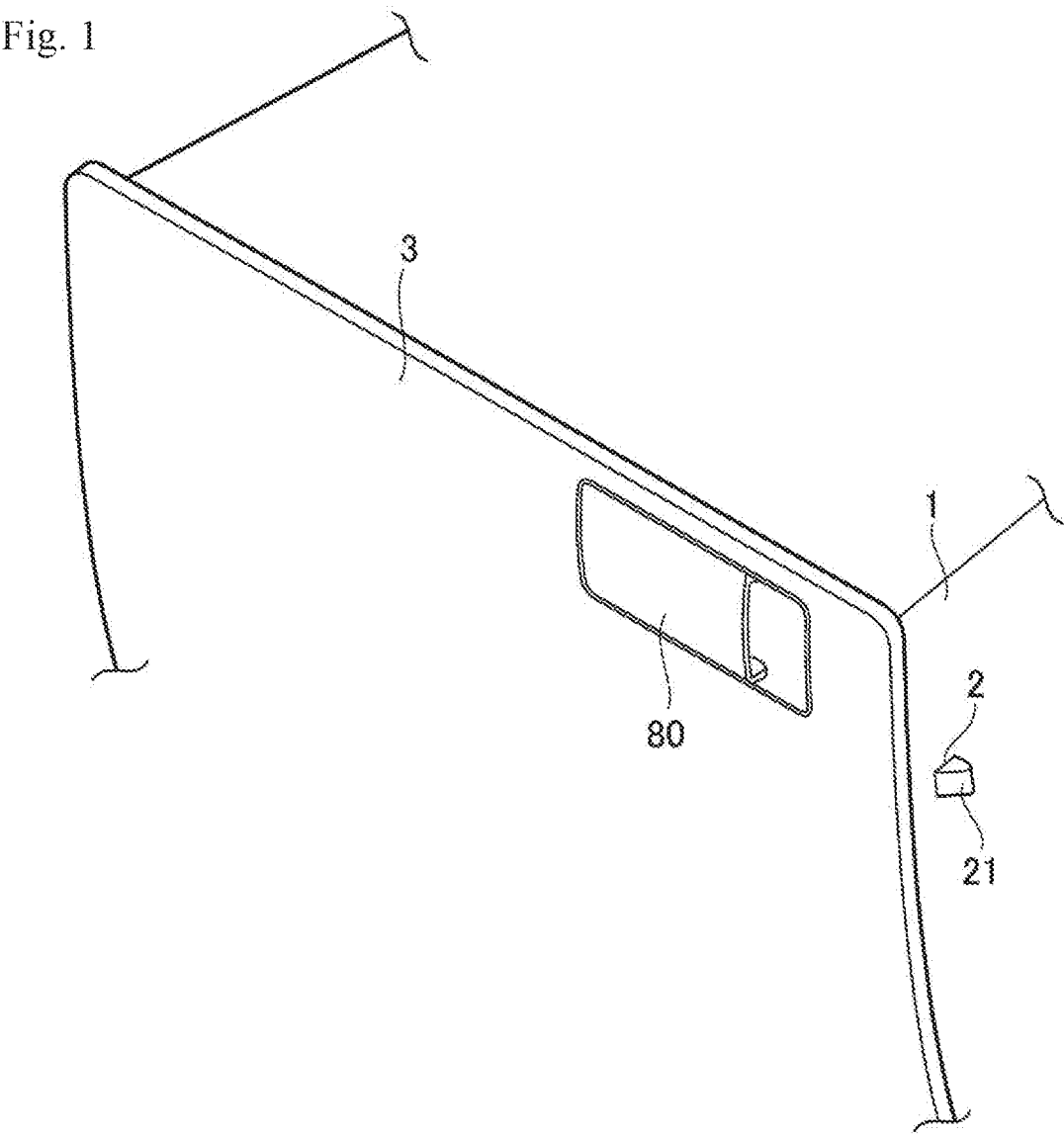
FIG. 1 illustrates an embodiment of a damper device according to the present invention, and is a perspective view when the damper device is applied to an opening/closing body.

Hereinafter, an embodiment of a damper device according to the present invention will be described with reference to the drawings.

The damper device applies a damping force when a pair of members move relative to each other. As shown in FIGS. 1, 2, 11, and 12, damper devices 10 according to this embodiment are provided between an opening/closing body 3 attached in an openable and closable manner with respect to an opening portion 1a of a fixed body 1 such as a glove box provided on an instrument panel of a vehicle, for example, and a pair of slide rods 20, 20 (hereinafter simply referred to as "rods 20") that are disposed so as to be slidable in a direction along a width direction of the opening/closing body 3 to be engaged with and disengaged from lock portions 2 provided on the fixed body 1, and applies damping force to the rods 20, 20 when the pair of rods 20, 20 slide. In particular, in this embodiment, on both side portions in a width direction of the opening/closing body 3, when a lock pin 21 provided on a tip end side of each rod 20 slides in a direction of engagement with the lock portions 2, 2 (see FIGS. 11 and 12) provided on inner surfaces on both sides of the opening portion 1a of the fixed body 1, a damping force is applied to each rod 20 to suppress generation of a hammering sound (impact sound).

The damper device according to this embodiment is used for a so-called side lock structure in which the tip end pins of a pair of slide rods slide on both side portions in a width direction of an opening/closing body, but can also be widely used in structures in which a pair of members can move relative to each other, for example, a housing and a latch projecting from or retracting into an opening of the housing, that are provided at a tip end center of an opening/closing body (so-called center lock structure), or a housing and an operation member or the like that is pushed or pulled with respect to the housing so as to cause a slide rod to slide.

Figure 2:
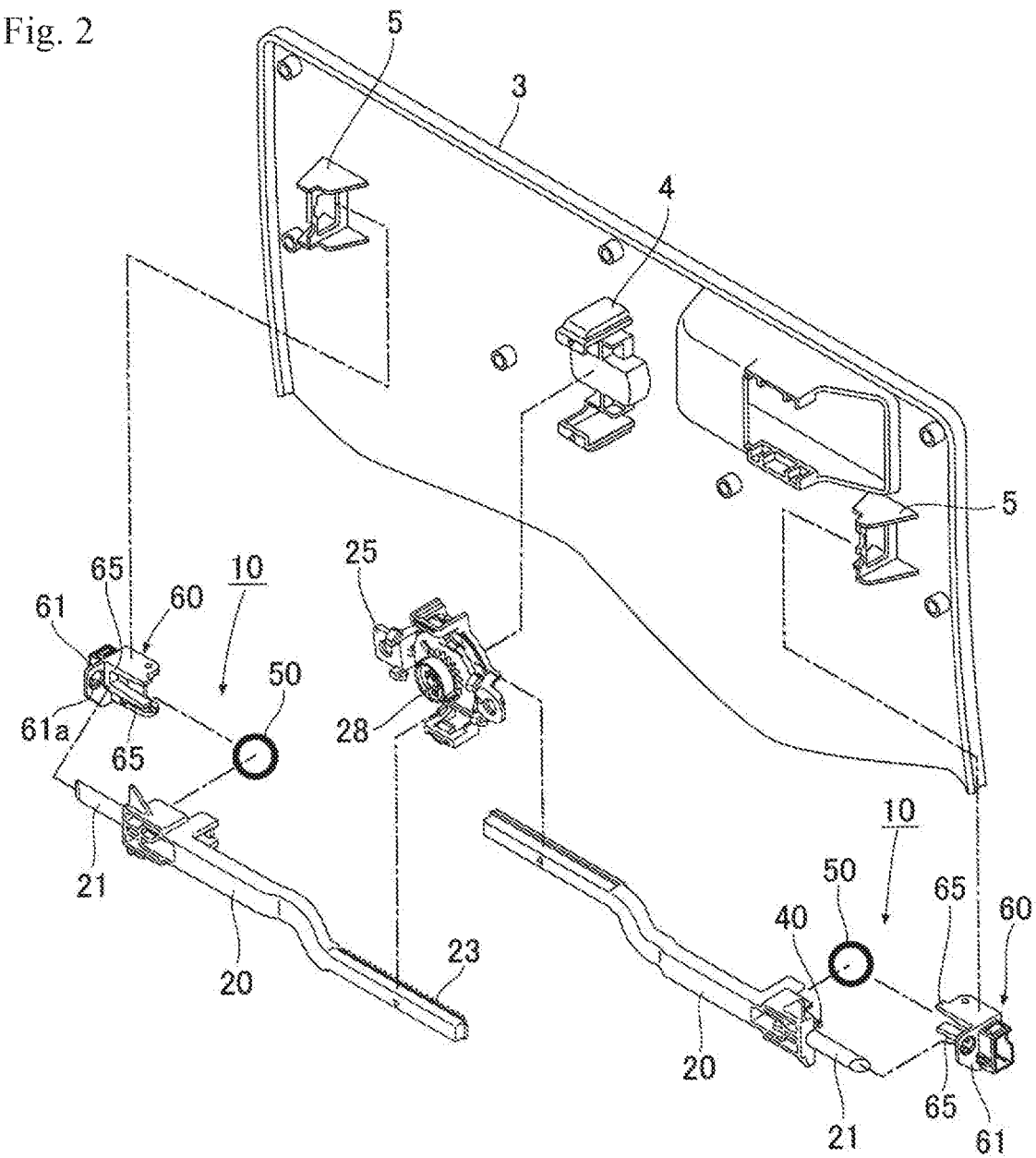
FIG. 2 is an exploded perspective view of the damper device.
Figure 5:
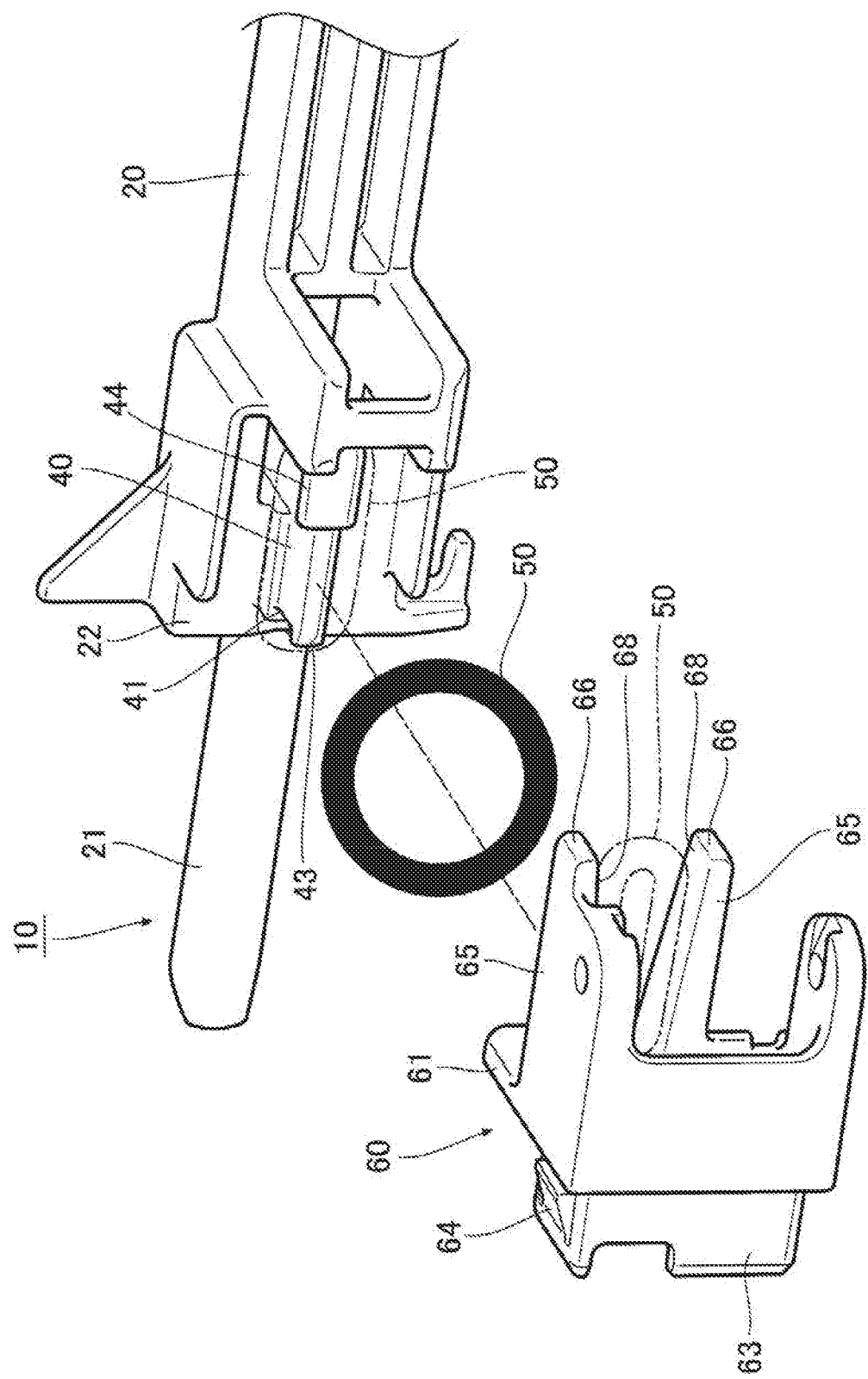
FIG. 5 is an enlarged perspective view of a main part of the damper device.

As shown in FIGS. 2 and 5, the damper device 10 according to this embodiment has an annular elastic member 50 made of an elastic resin material, and a support section 40 for supporting the annular elastic member 50 is provided on the rod 20 side. And a pair of facing walls 65, 65 into which the support section 40 is inserted when the pair of members move relative to each other, are provided in the opening/closing body 3. That is, in this embodiment, the rods 20 form the "one member" among the pair of members according to the present invention, and the opening/closing body 3 forms "the other member" among the pair of members according to the present invention.

As shown in FIG. 2, both the rods 20 have the same shape, which is a shape bent in a crank shape in the middle of its axial direction. Further, the tip end side of each rod 20 is provided with the lock pin 21 that can be engaged with and disengaged from the lock portion 2 of the fixed body 1 (see FIG. 2), and one side surface of the base end side thereof is formed with a rack groove 23 (see FIG. 3). The lock pin 21 has a substantially cylindrical shape, and has a tip end cut in a tapered shape. Further, as shown in FIGS. 3, 4, 11, and 12, the pair of rods 20, 20 are configured to slide in synchronization with a base member 25 fixed by screws or the like to an attachment base 4 (see FIG. 2) provided on the opening/closing body 3, with a rotation member 28 mounted in a rotatable manner interposed therebetween.

Figure 3:
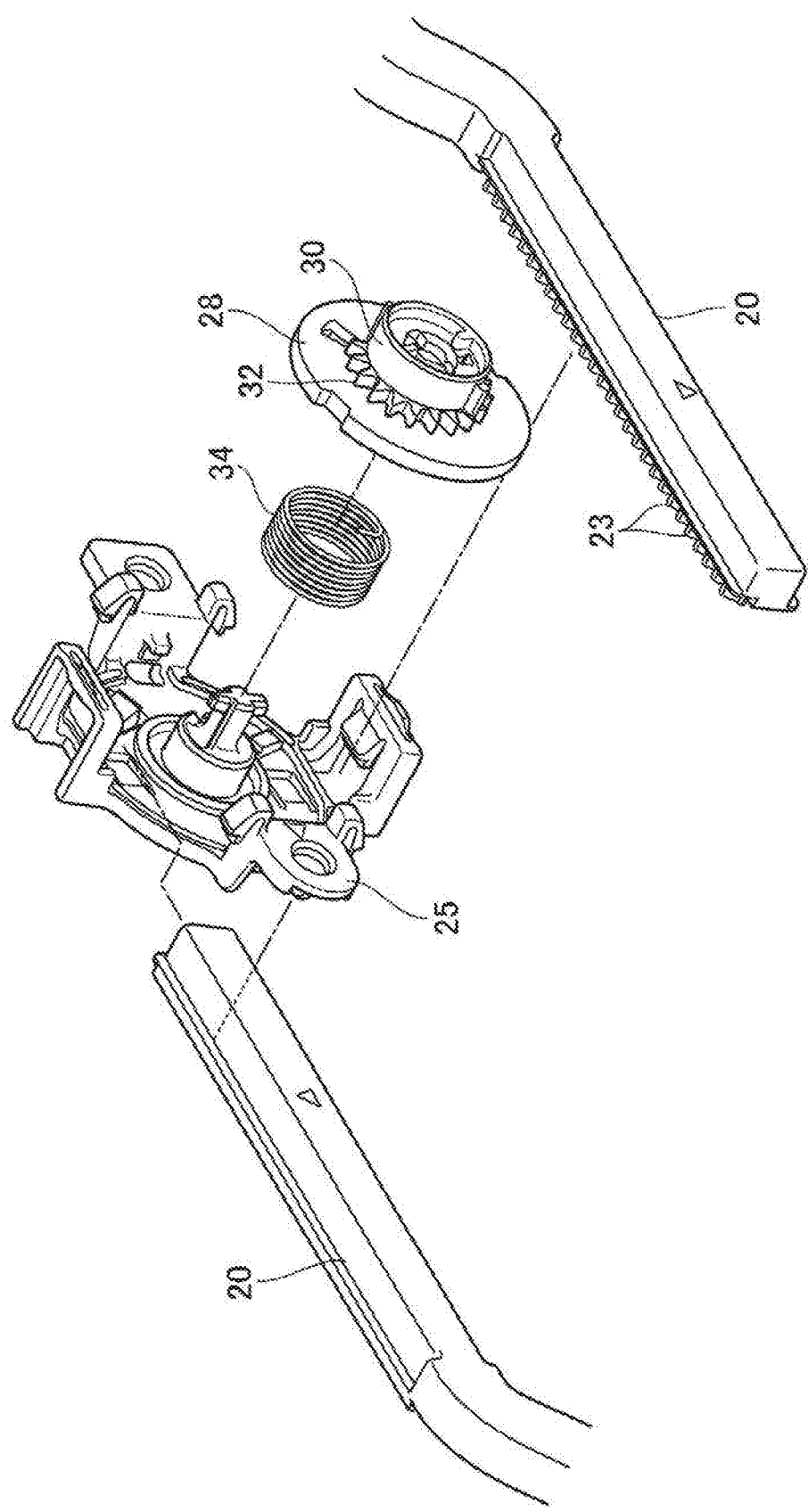
FIG. 3 is an exploded perspective view showing a rotation mechanism of a slide rod in the damper device.
Figure 4:
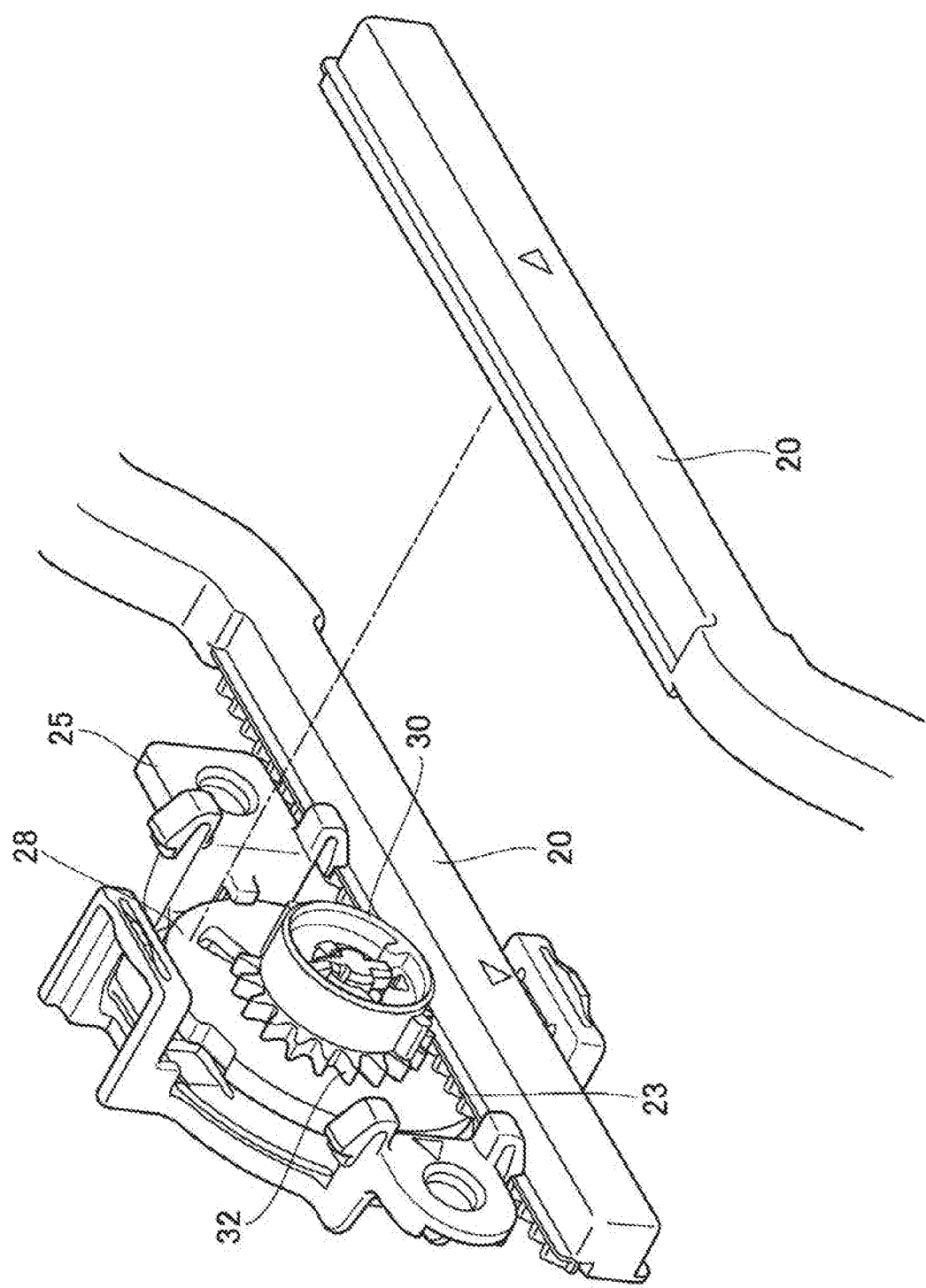
FIG. 4 is a perspective view showing the rotation mechanism of the slide rod in the damper device.

Further, as shown in FIGS. 3 and 4, the rotation member 28 has a cylindrical portion 30, and a pinion gear 32 is formed on an outer periphery of a base end thereof. The pair of rods 20, 20 are connected to each other via the rotation member 28 by the rack grooves 23 of the rods 20 meshing with the rotation member 28. The rotation member 28 is rotationally urged in a direction of an arrow F in FIG. 11 by an urging spring 34 (see FIG. 3) made of a torsion spring. As a result, the pair of rods 20, 20 are urged in the direction of engagement with the pair of lock portions 2, 2 of the fixed body 1, and slide in synchronization. That is, when one of the rods 20 slides, the other rod 20 also slides in conjunction therewith.

Further, when an operation member 80 (see FIG. 1) disposed on a front side of the opening/closing body 3 is operated, the pair of rods 20, 20 can pull the lock pins 21, 21 of the pair of rods 20, 20 from the lock portions 2, 2 against an urging force of the urging swing 34 to release the engagement between the lock pins 21 and the lock portions 2, thereby open the opening/closing body 3 with respect to the fixed body 1.

In this embodiment, as described above, the lock pins 21, 21 on the tip ends of the pair of slide rods 20, 20 are normally urged in the direction of engagement with the lock portions 2, 2. However, this embodiment has a holding means (not shown) that holds the lock pins 21, 21 of the rods 20, 20 in a state without being engaged with the lock portions 2, 2 against the urging force of the urging spring 34 when the operation member 80 is operated to slide the lock pins 21, 21 of the pair of slide rods 20, 20 in a direction of leaving the pair of lock portions 2, 2, and that releases holding of the lock pins 21, 21 of the rods 20, 20 and slides the lock pins 21, 21 in the direction of engagement with the lock portions 2, 2 when the opening/closing body 3 is closed with respect to the opening portion 1*a* of the fixed body 1.

Further, as shown in FIG. 2, the attachment base 4 for attaching the base member 25 on which the rotation member 28 is mounted is provided at a center in a width direction on a back surface side of the opening/closing body 3, and both side portions in the width direction on the back surface side of the opening/closing body 3 are respectively provided with rod guide portions 5, 5 that have substantially rectangular frame shapes and that guides the sliding movement of the rods 20. A holding member 60 for slidably holding each rod 20 is assembled to each rod guide portion 5 (see FIG. 2). In this embodiment, the rod guide portions 5 and the holding members 60 guide the pair of rods 20, 20 to slide along the width direction of the opening/closing body 3, and this direction refers to a movement direction X of the one member or the other member (in this embodiment, the movement direction X of the rods 20 (see FIG. 11)).

Figure 6:
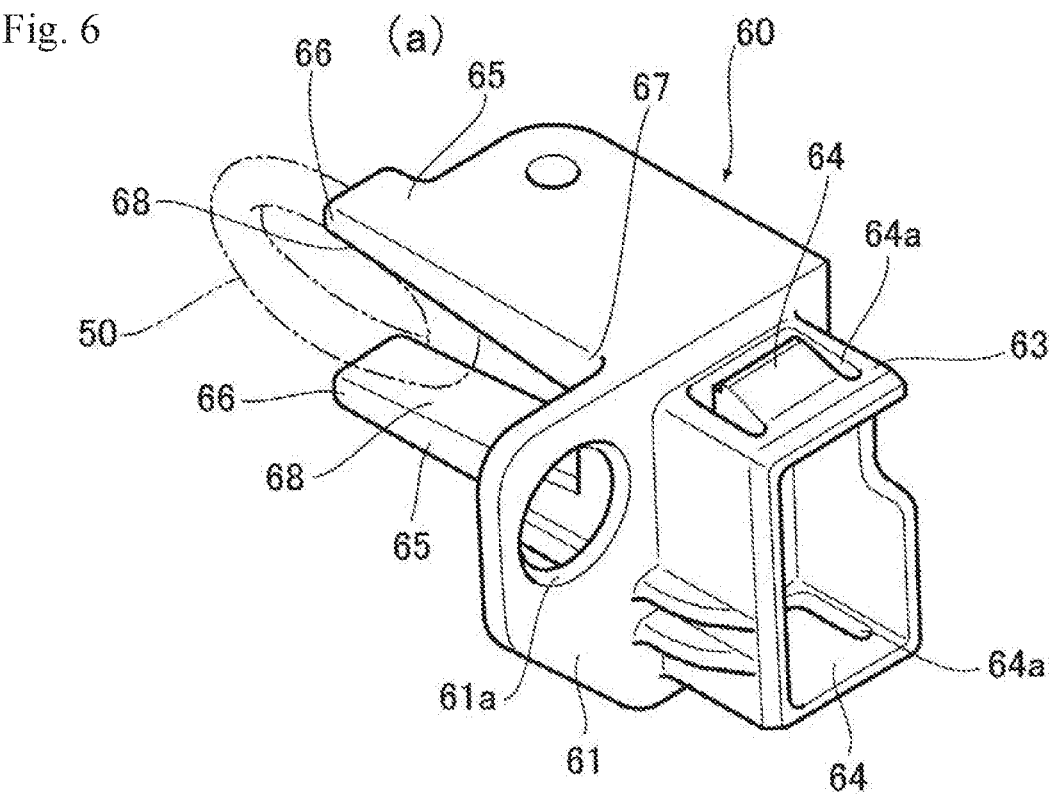
FIG. 6 illustrates a holding member provided with a pair of facing walls constituting the damper device, where (a) of FIG. 6 is a perspective view, and (b) of FIG. 6 is a perspective view when viewed from a direction different from (a) of FIG. 6.
Figure 6:
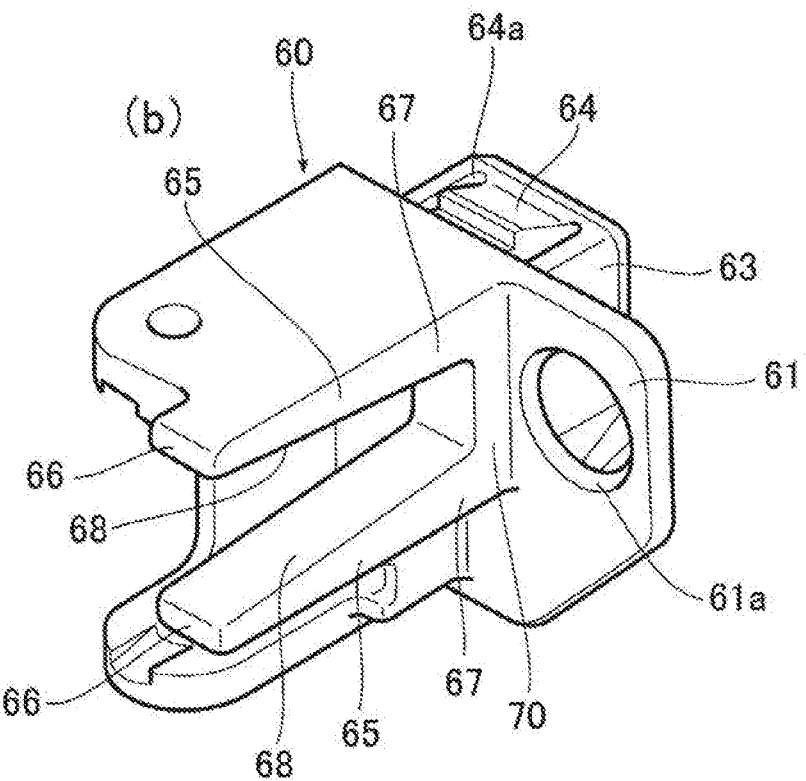
Figure 7:
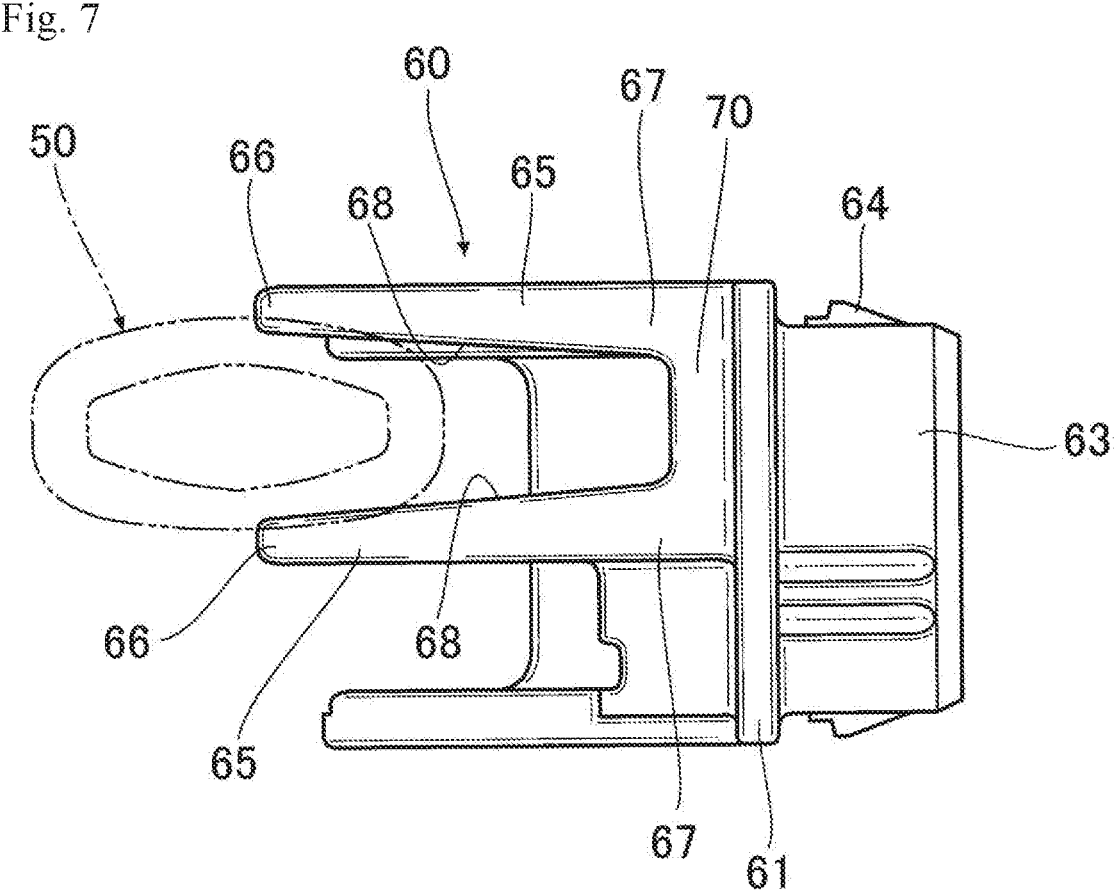
FIG. 7 is a front view of the holding member provided with the pair of facing walls constituting the damper device.

As shown in FIGS. 5 to 7, each holding member 60 in this embodiment is provided with a wall portion 61 having a circular insertion hole 61*a* into which the lock pin 21 at the rod tip end is inserted, and one surface side of the wall portion 61 is provided with an attachment portion 63 having a substantially rectangular frame shape. Both side portions of the attachment portion 63 are respectively formed with engagement claws 64 that are bendable via U-shaped slits 64*a*, and as shown in FIG. 2, the attachment portion 63 is inserted into the rod guide portion 5, whereby the engaging claws 64, 64 are engaged with an inner peripheral edge of the rod guide portion 5, and the holding member 60 is assembled to the opening/closing body 3 via the rod guide portion 5.

The pair of facing walls 65, 65 extend from a surface opposite to a surface of the wall portion 61 provided with the attachment portion 63, in a direction perpendicular to a surface direction of the wall portion 61. That is, the facing walls 65 are integrally formed with the wall portion 61. The pair of facing walls 65, 65 have the support section 40 inserted. therebetween when the pair of members move relative to each other, so as to press, bend and deform the annular elastic member 50 mounted on the support section 40.

Further, as shown in FIGS. 6 and 7, the pair of facing walls 65, 65 has an opening between tip ends 66, 66 in an extending direction away from the wall portion 61, and the support section 40 provided on the rod 20 side can enter between the tip ends 66, 66. Outer surfaces of the pair of facing walls 65, 65 are formed parallel to each other. On the other hand, inner surfaces 68, 68 of the pair of facing walls 65, 65, which face each other, have a larger width on the tip end 66, 66 side, and have an inclined surface shape that gradually narrows toward the base end 67 side opposite to the tip ends 66. Inner surfaces of the tip ends 66 of the facing walls 65 form an R shape.

The base end 67, 67 side opposite to the tip ends 66, 66 of the pair of facing walls 65, 65 is provided with a stopper wall 70 perpendicular to the extending direction of the pair of facing walls 65, 65. Therefore, as shown in FIG. 7, when the pair of facing walls 65, 65 are viewed from a lateral side, the pair of facing walls 65, 65 and the stopper wall 70 are formed together in a substantially U-shaped frame shape with a tip end and lateral sides forming an opening.

Figure 8:
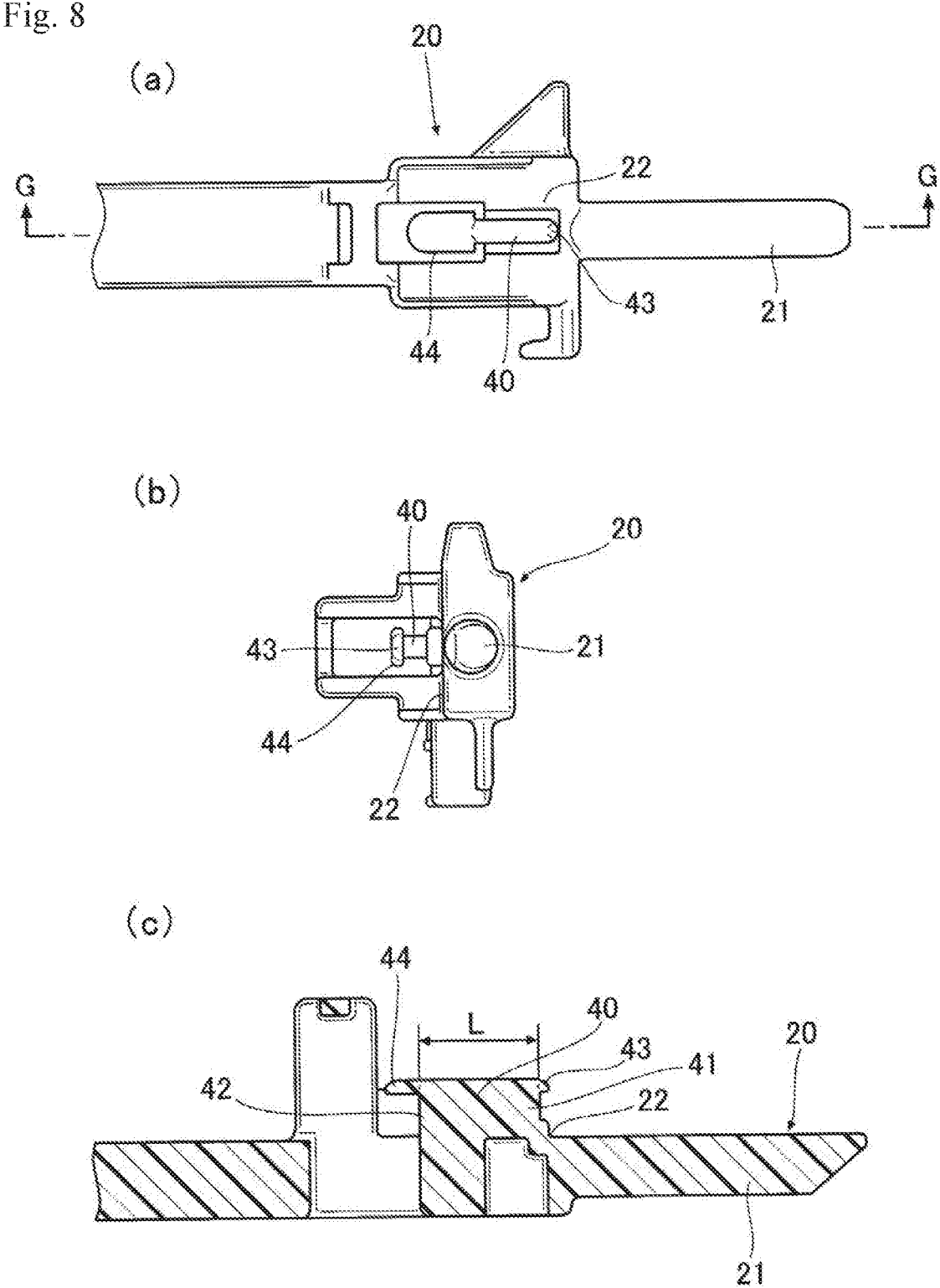
FIG. 8 illustrates a tip end side of a slide rod provided with a support section constituting the damper device, where (a) of FIG. 8 is a front view, (b) of FIG. 8 is a right side view, and (c) of FIG. 8 is a cross-sectional view taken along line G-G in (a) of FIG. 8.
Figure 9:
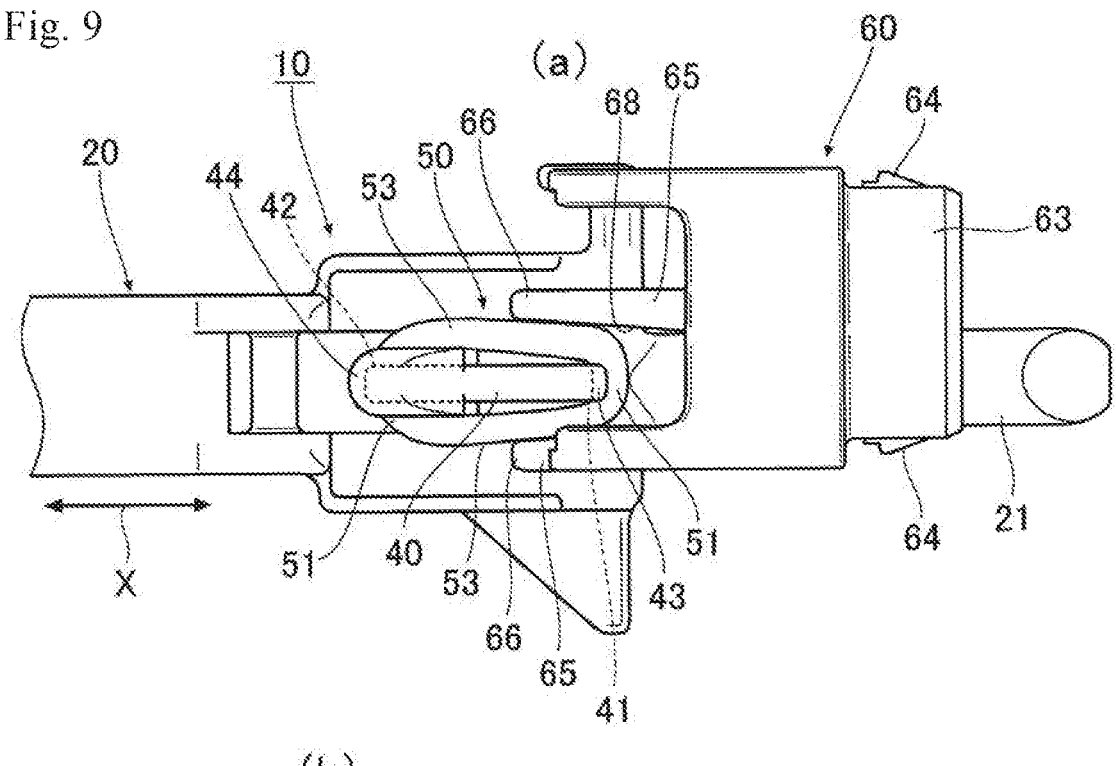
FIG. 9 illustrates a state where the damper device is in use, where (a) of FIG. 9 is an explanatory view of a state where the support section starts to be inserted between the pair of facing walls, and (b) of FIG. 9 is an explanatory view of a state where the support section is inserted between the pair of facing walls deeper than (a) of FIG. 9.
Figure 9:
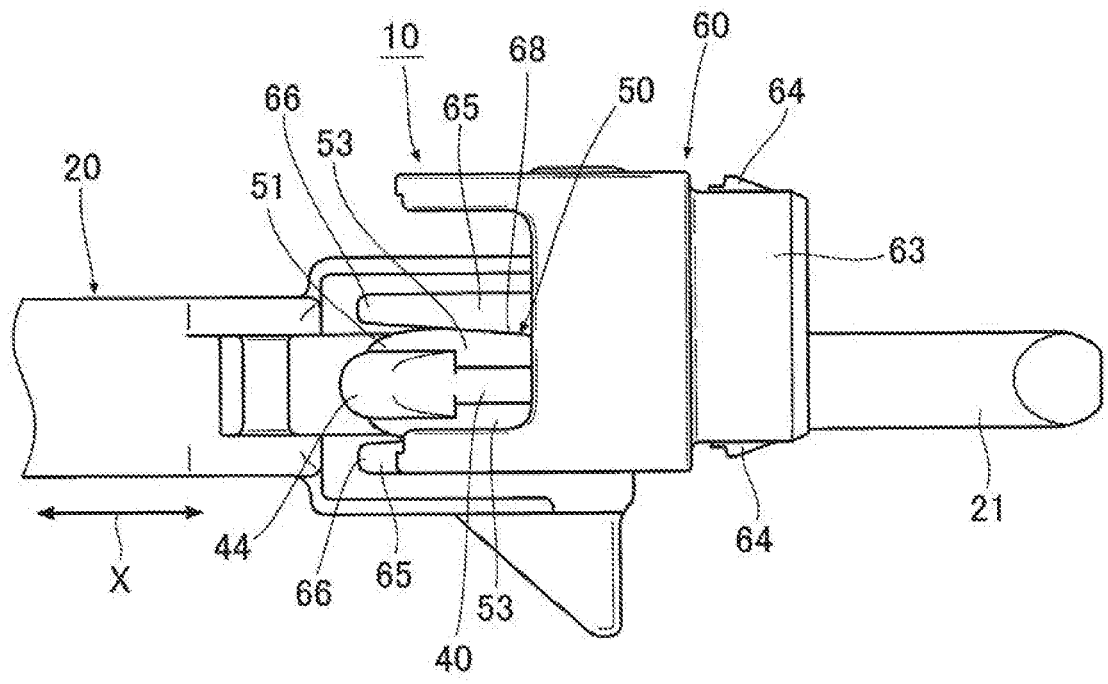
Figure 10:
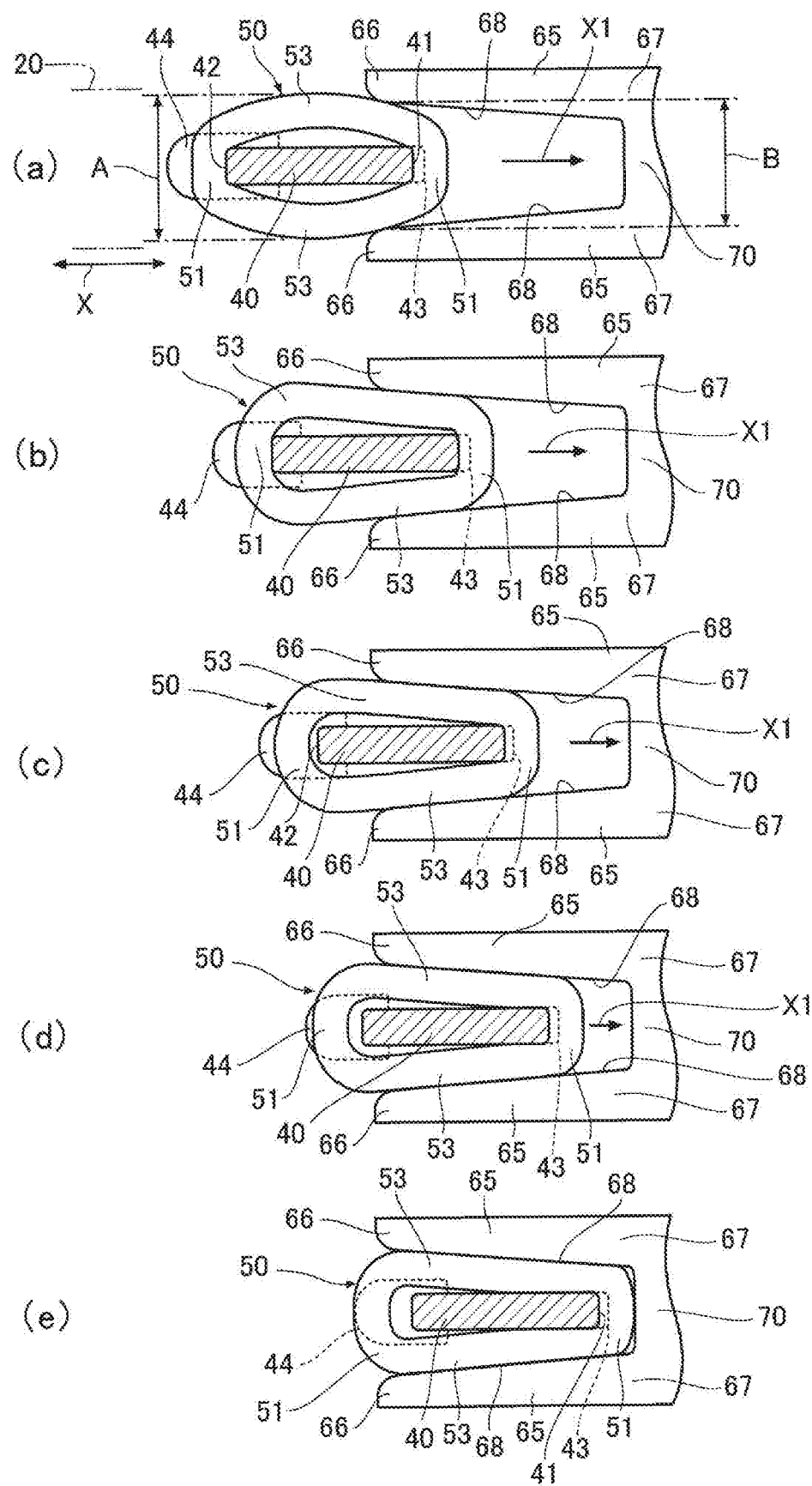
FIG. 10 illustrates a state where the damper device is in use, where (a) of FIG. 10 is an explanatory views of a first use state, (b) of FIG. 10 is an explanatory view of a second use state, (c) of FIG. 10 is an explanatory view of a third use state, (d) of FIG. 10 is an explanatory view of a fourth use state, and (e) of FIG. 10 is an explanatory view of a fifth use state.
Figure 11:
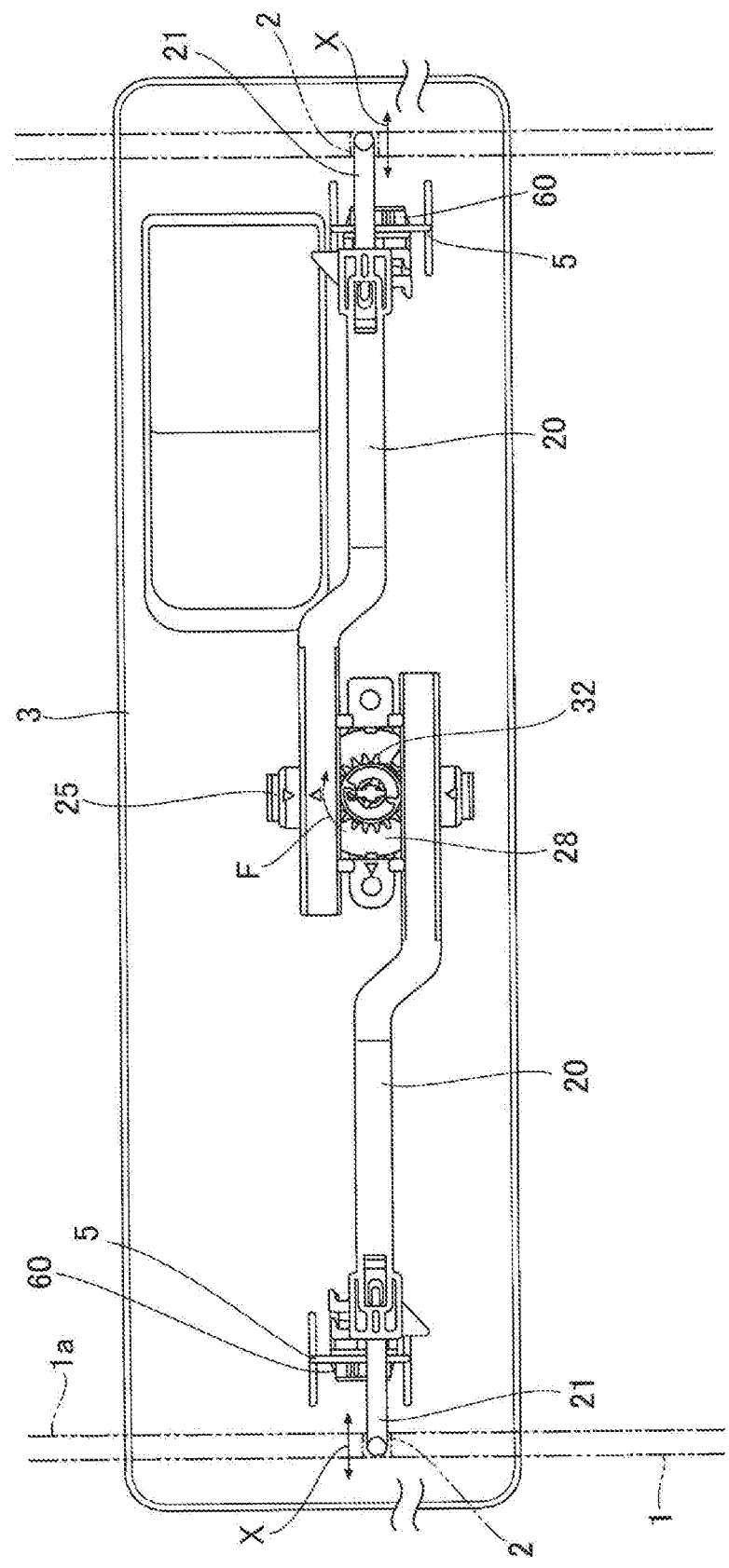
FIG. 11 is an explanatory view showing a state where an opening/closing body is closed in a lock device to which the damper device is applied.
Figure 12:
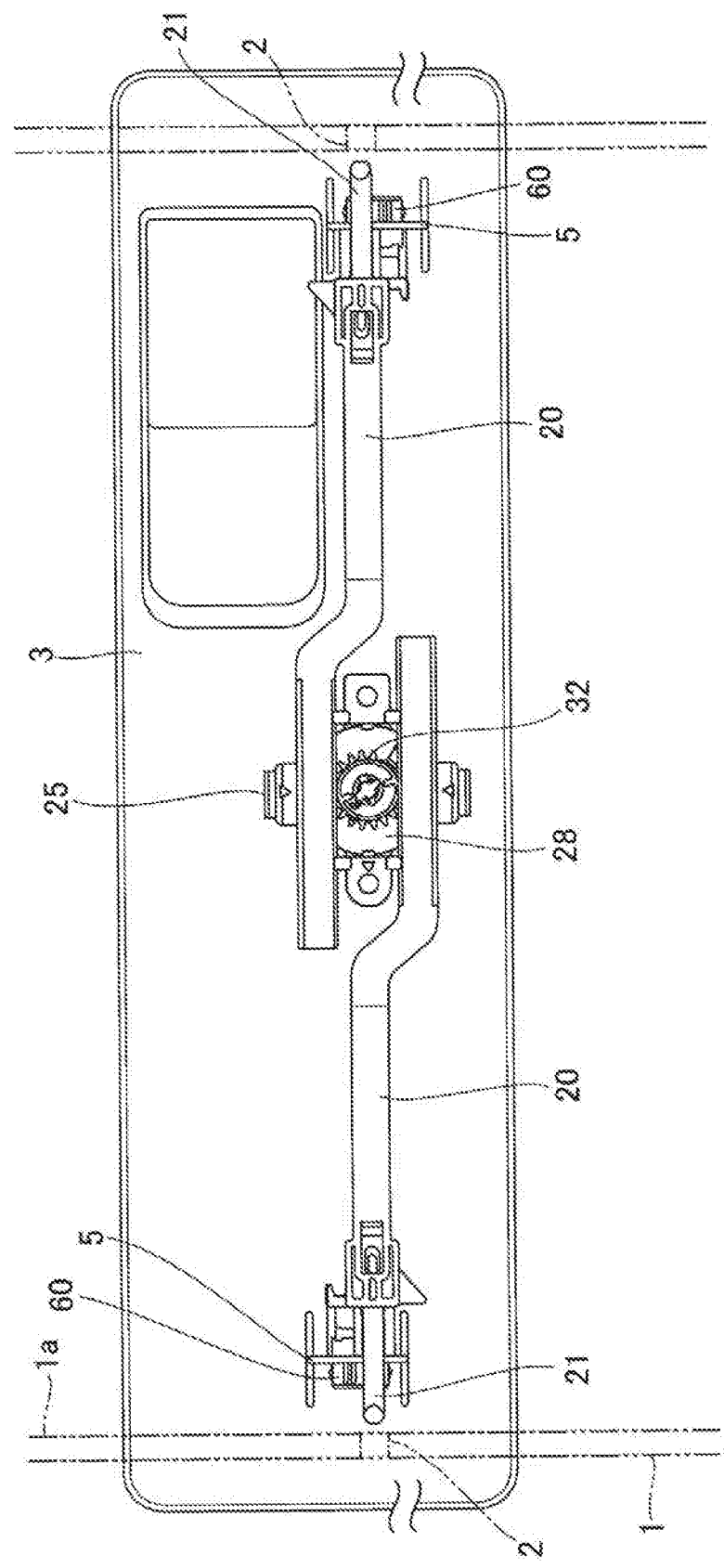
FIG. 12 is an explanatory view showing a state where an opening/closing body is open in a lock device to which the damper device is applied.

As shown in FIGS. 2 and 5, the support section 40 that supports the annular elastic member 50 is adjacent to the lock pin 21, is the tip end side of the rod 20, and is provided on a side surface 22 (see FIG. 5) facing the opening/closing body 3. Referring to FIGS. 8 to 10 as well, the support section 40 forms a ridge that is elongated at a constant width along the axial direction of the rod 20, and a length 1*a* (see (c) of FIG. 8) along the axial direction of the support section 40 is longer than a maximum inner diameter of the annular elastic member 50, which has a circular shape in a state before being mounted on the support section 40, as shown in FIG. 5. Further, as shown in (a) of FIG. 9, the support section 40 is configured to be inserted between the tip ends 66, 66 of the pair of facing walls 65, 65 from one end 41 side in the length direction thereof (the direction along the axial direction of the rod), and the one end 41 and the other end 42 on the opposite side thereof form both ends in the movement direction X of the pair of members. As shown in FIG. 10, R shaped curved surfaces are formed at corners of both ends 41, 42 of the support section 40, which makes an inner periphery of the annular elastic member 50 less likely to be scratched.

The annular elastic member 50, which is made of an elastic resin material such as a rubber material or an elastic elastomer, is mounted on the outer periphery of the support section 40. As shown in FIGS. 2 and 5, the annular elastic member 50 has a circular shape in a state before being mounted on the support section 40, and has a maximum inner diameter smaller than the length L (see (c) of FIG. 8) of the support section 40. Therefore, as shown in FIG. 9, the annular elastic member 50 is mounted on the outer periphery of the support section 40 in an elongated state.

Further, as shown in (a) of FIG. 10, in the state where the annular elastic member 50 is mounted on the outer periphery of the support section 40, portions of the inner periphery of the annular elastic member 50, the portions facing each other in the movement direction X of the rod 20 (in this embodiment, both ends in the movement direction X of the rod 20), form contact portions 51, 51 that are in contact with the outer periphery of the support section 40. Portions of the inner periphery of the annular elastic member 50, the portions facing each other in a direction perpendicular to the movement direction X of the rod 20, are provided with separated portions 53, 53 that are separated from the outer periphery of the support section 40. In this embodiment, the portions of the annular elastic member 50, the portions being in close contact with the outer peripheries of both ends 41, 42 of the support section 40, form the contact portions 51, 51. The portions of the annular elastic member 50, the portions being separated from both side surfaces perpendicular to both ends 41, 42 of the support section 40, form the separated portions 53, 53.

Further, as shown in FIG. 9 and (a) of FIG. 10, the annular elastic member 50 of this embodiment is mounted on the support section 40 in a state where the pair of contact portions 51, 51 are parallel to each other and the pair of separated portions 53, 53 between the pair of contact portions 51, 51 are bent and deformed in an arc shape outward from the support section. As shown in (a) of FIG. 10, the inner peripheries of the separated portions 53, 53 of the annular elastic member 50 are farthest from both side surfaces of the support section 40 in an axial center of the support section 40.

As shown in (a) of FIG. 10, in the state where the annular elastic member 50 is mounted on the outer periphery of the support section 40, a maximum distance A of the pair of separated portions 53, 53 of the annular elastic member 50, which face each other (a maximum distance in the direction perpendicular to the movement direction X of the rod 20 on the outer periphery of the annular elastic member 50, and a distance between the outer peripheries of the spaced portions 53, 53 at positions farthest from both side surfaces of the support section 40), is larger than an opening width B between the tip ends 66, 66 of the pair of facing walls 65, 65 provided on the opening/closing body 3 side on a side on which the support section 40 enters (here, a width between ends on the stopper wall 70 side of the R-shaped inner surfaces of the tip ends 66, 66).

In this embodiment, as shown in (a) of FIG. 10, when the annular elastic member 50 is mounted on the support section 40 and before the pair of members move relative to each other (here, in a state where the lock pin 21 of the rod 20 is retracted and held, by a holding means that is not shown, in a position where the lock pin 21 is not engaged with the lock portion 2), the annular elastic member 50 is in contact with the R-shaped inner surfaces of the tip ends 66, 66 of the pair of facing walls 65, 65 while maintaining the separated portions 53, 53, A state where the one end 41 side of the support section 40 starts to be inserted between the pair of facing walls 65, 65, is shown in (a) of FIG. 9.

Then, when the opening/closing body 3 is closed with respect to the opening portion 1a of the fixed body 1 and the lock pins 21, 21 of the rods 20, 20 are released from holding from the state shown in (a) of FIG. 10, that is, the state in which the lock pin 21 of each rod 20 is retracted and held, by the holding means that is not shown, in the position where the lock pin 21 is not engaged with the lock portion 2, the lock pin 21 of each rod 20 slides in a direction in the direction of engagement with the lock portion 2, and the support section 40 is inserted from between the tip ends 66, 66 of the pair of facing walls 65, 65 in the direction indicated by the arrow X.

At this time, in the damper device 10, as shown in (a) of FIG. 10, in the state where the annular elastic member 50 is mounted on the outer periphery of the support section 40, the maximum distance A of the separated portions 53, 53 of the annular elastic member 50, which faces each other, is greater than the opening width B between the tip ends 66, 66 of the pair of facing walls 65, 65 on the side on which the support section 40 enters. Therefore, as shown in (b) to (e) of FIG. 10, when the support section 40 is inserted between the pair of facing walls 65, 65, the separated portions 53, 53 of the annular elastic member 50 are pushed by the tip ends 66, 66 of the pair of facing walls 65, 65 so as to be bent and deformed in a narrowed manner, and then pressed against the inner surfaces 68, 68 of the pair of facing walls 65, 65.

As shown in (e) of FIG. 10, when the outer periphery of the contact portion 51 of the annular elastic member 50 on the tip end side in the movement direction X comes into contact with an inner surface of the stopper wall 70, at least a part of the inner periphery of the annular elastic member 50 in the separated portions 53, 53 comes into contact with the outer periphery of the support section 40. Here, a predetermined range of the inner periphery of the separated portions 53, 53 from the tip end side in the movement direction X (the one end 41 side of the support section 40) comes into contact with the outer periphery of the support section 40.

Returning to the description on the support section 40, as shown in FIGS. 5, 8, and 9, both ends 41, 42 of the support section 40 in this embodiment in the movement direction X (axial direction of the support section 40) of the pair of members are respectively provided with flange portions 43, 44 that can be engaged with a side surface (side surface in the thickness direction) of the annular elastic member 50.

More specifically, the support section 40 is provided with the flange portion 43 which protrudes from a tip end edge of the one end 41 on a tip end side in the protruding direction from a side surface 22 (see FIG. 5) of the rod 20 of the support section 40, so as to form an eaves shape (see FIGS. 8 and 9). On the other hand, the support section 40 is provided with the flange portion 44 which protrudes from a peripheral edge on the other end 42 side on the tip end side of the support section 40 in the protruding direction, so as to form a substantially U shape that has an expanded diameter with respect to the outer periphery of the support section (see FIGS. 8 and 9).

As shown in (a) of FIG. 10, among the flange portions 43, 44, the flange portion 43 on an insertion direction side toward the pair of facing walls 65, 65 is shorter than a diameter at the contact portions 51 of the annular elastic member 50 mounted on the support section 40, so as not to protrude from the contact portion 51. The flange portion 44 on a side opposite to the insertion direction toward the pair of facing walls 65, 65 is longer than a diameter at the contact portions 51 of the annular elastic member 50 mounted on the support section 40 (see (a) of FIG. 10).

The annular elastic member, the support section, and the pair of facing walls described above are not limited to the shapes described above. That is, the annular elastic member 50 in this embodiment has a circular shape before being mounted on the support section 40. However, the annular elastic member may have, for example, an elliptical shape, an oval shape whose both ends are arc-shaped, or a rectangular frame shape. The shape and structure of the support section may be not only a ridge extending at a constant width, but also a shape having an elliptical or polygonal cross section, a columnar shape, a tubular shape, or the like. Further, the pair of facing walls may have, for example, a V-like frame shape (a structure without a stopper wall) or a U-like frame shape (a structure in which a stopper wall has an arc shape).

That is, the annular elastic member and the support section which supports the annular elastic member according to the present invention may have any structure, as long as in the state where the annular elastic member is mounted on the outer periphery of the support section, the portions of the inner periphery of the annular elastic member, the portions facing each other in the movement direction, form the contact portions that are in contact with the outer periphery of the support section, and the portions of the inner periphery of the annular elastic member, the portions facing each other in the direction perpendicular to the movement direction, are provided with the separated portions that are separated from the outer periphery of the support section. In addition to the annular elastic member and the support section, the pair of facing walls may have any structure, as long as in the state where the annular elastic member is mounted on the outer periphery of the support section, the maximum distance A of the separated portions of the annular elastic member, which faces each other, is greater than the opening width B between the tip ends of the pair of facing walls on the side on which the support section enters.

Next, functions and effects of the damper device 10 having the above configuration will be described.

That is, a state where the opening/closing body 3 is opened from the opening portion 1a of the fixed body 1 is the state shown in (a) of FIG. 10, that is, the lock pin 21 of each rod 20 is retracted and held, by the holding means that is not shown, in the position where the lock pin 21 is not engaged with the lock portion 2. Further, in this state, that is, in a state where the annular elastic member 50 is mounted on the support section 40 and before the pair of members move relative to each other, the annular elastic member 50 is in contact with the R-shaped inner surfaces 68 of the tip ends 66, 66 of the pair of facing walls 65, 65 while maintaining the separated portions 53, 53.

Then, when the opening/closing body 3 is closed with respect to the opening portion 1a of the fixed body 1 and the lock pins 21, 21 of the rods 20, 20 are released from holding from the state described above, the lock pin 21 of each rod 20 slides in the direction in the direction of engagement with the lock portion 2, and thus the support section 40 is inserted from between the tip ends 66, 66 of the pair of facing walls 65, 65 in the direction indicated by an arrow X1 in (a) of FIG. 10.

Then, the outer peripheries of the separated portions 53, 53 of the annular elastic member 50, which faces each other in the direction perpendicular to the movement direction X1, are pushed and bent by the tip ends 66, 66 of the pair of facing walls 65, 65, and simultaneously, the annular elastic member 50 enters between the pair of facing walls 65, 65. At the same time, the outer peripheries of the separated portions 53, 53 are pressed by the inner surfaces 68, 68 of the pair of facing walls 65, 65, so that the separated portions 53, 53 are bent and deformed into a non-parallel manner such that the separated portions 53, 53 are narrowed from the tip end side in the movement direction X1 (the one end 41 side of the support section 40) and a gap between the inner peripheries of the separated portions 53, 53 and the outer peripheries of the support section 40 is reduced, and at the same time, the outer peripheries of the separated portions 53, 53 are pressed against the inner surfaces 68, 68 of the pair of facing walls 65, 65, and the pressing amount gradually increases (see (b) of FIG. 10). The contact portion 51 of the annular elastic member 50 on the side opposite to the movement direction X1 (the other end 42 side of the support section 40) is bent and deformed so as to form an arc shape.

When the annular elastic member 50 moves to a deeper side of the pair of facing walls 65, 65 (the stopper wall 70 side) via the support section 40 from the state shown in (b) of FIG. 10, as shown in (c) of FIG. 10, the tip end side of the inner peripheries of the separated portions 53, 53 in the movement direction X1 come into contact with the outer periphery of the support section 40, so that the gap between the separated portions 53, 53 and the outer periphery of the support section 40 is reduced, and the pressing amount between the outer periphery of the annular elastic member 50 and the inner surfaces 68, 68 of the pair of facing walls 65, 65 is further increased. The contact portion 51 of the annular elastic member 50 on the side opposite to the movement direction X1 is separated from the other end 42 of the support section 40.

When the annular elastic member 50 further moves to the stopper wall 70 side from the state shown in (c) of FIG. 10, as shown in (d) of FIG. 10, the contact amount of the inner peripheries of the separated portions 53, 53 against the support section 40 is further increased, so that the gap between the inner peripheries of the separated portions 53, 53 and the outer periphery of the support section 40 is reduced, and the pressing amount between the outer peripheries of the separated portions 53, 53 and the inner surfaces 68, 68 of the pair of facing walls 65, 65 is further increased.

When the annular elastic member 50 further moves to the stopper wall 70 side from the state shown in (d) of FIG. 10, as shown in (e) of FIG. 10, when the outer periphery of the contact portion 51 of the annular elastic member 50 on the tip end side in the movement direction X1 comes into contact with an inner surface of the stopper wall 70, further movement of the annular elastic member 50 is regulated, the contact amount of the inner peripheries of the separated portions 53, 53 against the support section 40 is further increased, so that the gap between the inner peripheries of the separated portions 53, 53 and the outer periphery of the support section 40 is reduced, and the pressing amount between the outer peripheries of the separated portions 53, 53 and the inner surfaces 68, 68 of the pair of facing walls 65, 65 is further increased.

As described above, in the damper device 10, as shown in (a) of FIG. 10, in the state where the annular elastic member 50 is mounted on the outer periphery of the support section 40, the maximum distance A of the separated portions 53, 53 of the annular elastic member 50, which faces each other, is greater than the opening width B between the tip ends 66, 66 of the pair of facing walls 65, 65 on the side on which the support section 40 enters. Therefore, when the lock pin 21 of each rod 20 slides in the direction of engagement with the lock portion 2 and the support section 40 is inserted between the tip ends 66, 66 of the pair of facing walls 65, 65, as shown in (a) to (e) of FIG. 10, the outer peripheries of the separated portions 53, 53 of the annular elastic member 50 are pushed and bent by the tip ends 66, 66 of the pair of facing walls 65, 65, the annular elastic member 50 enters between the pair of facing walls 65 and 65, the outer peripheries of the separated portions 53, 53 of the annular elastic member 50 is pressed by the inner surfaces 68, 68 of the pair of facing walls 65, 65, and the separated portions 53 and 53 of the annular elastic member 50 is bent and deformed in a narrowed manner. Then, the separated portions 53, 53 are pressed against the inner surfaces 68, 68 of the pair of facing walls 65, 65, and the pressing amount gradually increases. Therefore, when the damping force for damping the pair of members, here, the damping force of each rod 20 when the lock pin 21 on the rod front end side slides in the direction of engagement with the lock portion 2, can be sufficiently obtained, and generation of hammering sound (impact sound) at that time can be effectively suppressed. As described above, according to the damper device 10, by simply configuring the damper device 10 such that the annular elastic member 50 is mounted on the support section 40 provided on the rod 20, which is the one member, and the pair of facing walls 65, 65 are provided on the opening/closing body 3 side, which is the other member, it is possible to provide the damper device 10 with a low manufacturing cost while providing sufficient damping force.

Further, in this embodiment, as shown in FIGS. 2 and 5, the annular elastic member 50 has a circular shape in the state before being mounted on the support section 40. Therefore, when the annular elastic member 50 having the circular shape is mounted on the support section 40, the annular elastic member 50 can be elongated to apply an elastic force to the separated portions 53, 53 of the annular elastic member 50 (when the annular elastic member has an elliptical shape, an oval shape, or the like, the annular elastic member is unlikely to be elongated when mounted on the support section, and an elastic force is unlikely to be generated in the separated portions). When the one member or the other member moves (here, when the rod 20 moves in the direction in which the lock pin 21 thereof engages with the lock portion 2) so that the support section 40 is inserted between the pair of facing walls 65, 65 and the annular elastic member 50 is bent and deformed by the pair of facing walls 65, 65, the elastic force applied to the separation portions 53, 53 of the annular elastic member 50 can enhance the adhesion of the annular elastic member 50 to the inner surfaces 68, 68 of the pair of facing walls 65, 65, and can further increase the damping force.

Further, in this embodiment, as shown in FIG. 10, the base ends 67, 67 side on the side opposite to the tip ends 66, 66 of the pair of facing walls 65, 65 are provided with the stopper wall 70. Therefore, as shown in (e) of FIG. 10, when the pair of members move relative to each other (here, when the rod 20 moves), the annular elastic member 50 comes into contact with the stopper wall 70. Thereby, it is possible to prevent the annular elastic member 50 from further moving to the deeper side of the pair of facing walls 65 and 65. Further, when the pair of members moves relative to each other so that the support section 40 is inserted between the pair of facing walls 65, 65 and the annular elastic member 50 comes into contact with the stopper wall 70, as shown in (e) of FIG. 10, at least a part of the inner peripheries of the separated portions 53 of the annular elastic member 50 is in contact with the outer periphery of the support section 40. Therefore, the outer peripheries of the separated portions 53, 53 of the annular elastic member 50 are pressed against the inner surfaces 68, 68 of the pair of facing walls 65, 65, and in addition, the inner peripheries of the separated portions 53, 53 of the annular elastic member 50 are in contact with the outer periphery of the support section 40. Thereby, the damping force when the pair of members move relative to each other can be further increased.

Further, in this embodiment, as shown in FIG. 10, the inner surfaces 68, 68, which face each other, of the pair of facing walls 65, 65 have a wider width on the tip ends 66, 66 side, and have a gradually narrower width toward the base end 67 side opposite to the tip ends 66. Therefore, when the one member or the other member moves (here, when the rod 20 moves), the support section 40 is inserted between the pair of facing walls 65, 65, and the annular elastic member 50 moves between the pair of facing walls 65, 65, as the movement amount thereof increases, the pressing amount of the outer peripheries of the separated portions 53, 53 of the annular elastic member 50 with respect to the inner surfaces 68, 68 of the pair of facing walls 65, 65 can be gradually increased, and the damping force when the pair of members move relative to each other can be gradually increased.

Further, in this embodiment, as shown in FIGS. 5, 8, and 9, both ends 41, 42 of the support section 40 in the movement direction X of the pair of members are respectively provided with the flange portions 43, 44 that can be engaged with the side surface of the annular elastic member 50, Therefore, the annular elastic member 50 can be mounted in a state of being prevented from coming off from the support section 40. Further, among the flange portions 43, 44, the flange portion 43 on the insertion direction side toward the pair of facing walls 65, 65 does not protrude from the contact portions 51 of the annular elastic member 50 mounted on the support section 40. Therefore, when the pair of members move relative to each other (here, when the rod 20 moves), the outer periphery of the contact portion 51 of the annular elastic member 50 can come into contact with the stopper wall 70 before the flange portion 43 on the insertion direction side toward the pair of facing walls 65, 65 comes into contact with the stopper wall 70, and it is possible to suppress the occurrence of hammering sound caused by the flange portion 43 coming into contact with the stopper wall 70.

Further, in this embodiment, as shown in FIGS. 6, 7, and 9, the holding member 60 which slidably holds the rod 20 is provided with the wall portion 61 having the insertion hole 61a through which the rod 20 is inserted (here, the lock pin 21 at the tip end of the rod), and the pair of facing walls 65, 65 are integrally formed on the wall portion 61. Therefore, the wall portion 61 having the insertion hole 61a through which the rod 20 is inserted and supported and the pair of facing walls 65, 65 can be provided as a single member, which reduces the number of components. Further, by inserting the rod 20 into the insertion hole 61a of the wall portion 61, the rod 20 (here, the lock pin 21) can be arranged with high accuracy with respect to the pair of facing walls 65, 65 (by accurately manufacturing the wall portion 61, the accuracy of the arrangement positions of the pair of facing walls 65, 65 can be improved as well).

Furthermore, in this embodiment, as shown in (a) of FIG. 10, when the annular elastic member 50 is mounted on the support section 40 and before the pair of members move relative to each other, the annular elastic member 50 is in contact with the inner surfaces 68, 68 of the tip ends 66, 66 of the pair of facing walls 65, 65 while maintaining the separated portions 53, 53. Therefore, when the one member or the other member moves (here, when the rod 20 moves), the support section 40 is inserted between the pair of facing walls 65, 65, and the annular elastic member 50 moves between the pair of facing walls 65, 65, the annular elastic member 50 is already in contact with the inner surfaces of the tip ends of the pair of facing walls 65, 65. As a result, due to the bending deformation as the annular elastic member 50 moves, the change in the damping force becomes smooth, which can improve and the feeling, and can also increase an initial response force of the damping force.

FIGS. 13 to 16 show another embodiment of the damper device according to the present invention. Substantially the same parts as those in the above-described embodiments are denoted by the same reference numerals, and description thereof will be omitted.

In a damper device 10A according to this embodiment, the pair of members are configured such that one member and the other member are rotatable relative to each other. Specifically, the damper device 10A is mounted on a lock device having the slide rod 20 as shown in FIGS. 1 to 12, for example, so as to be used as an operation member for sliding the slide rod.

As shown in FIGS. 13 to 16, the damper device 10A includes a case 81 having a horizontally long box shape, an operation lever 83 rotatably mounted on one longitudinal end of the case 81, and a cover 85 mounted on a surface side of the operation lever 83.

Figure 13:
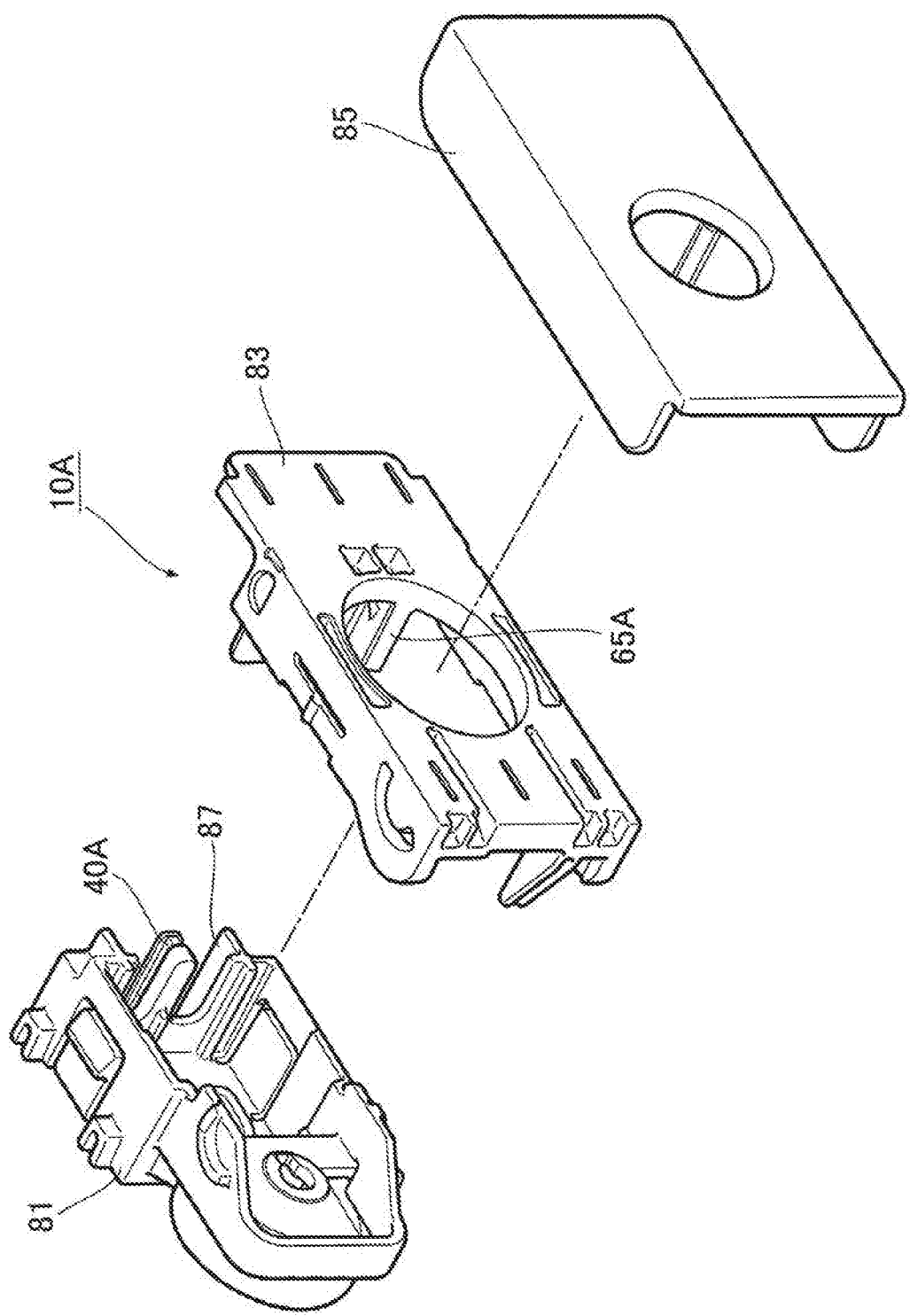
FIG. 13 is an exploded perspective view of another embodiment of the damper device according to the present invention.
Figure 15:
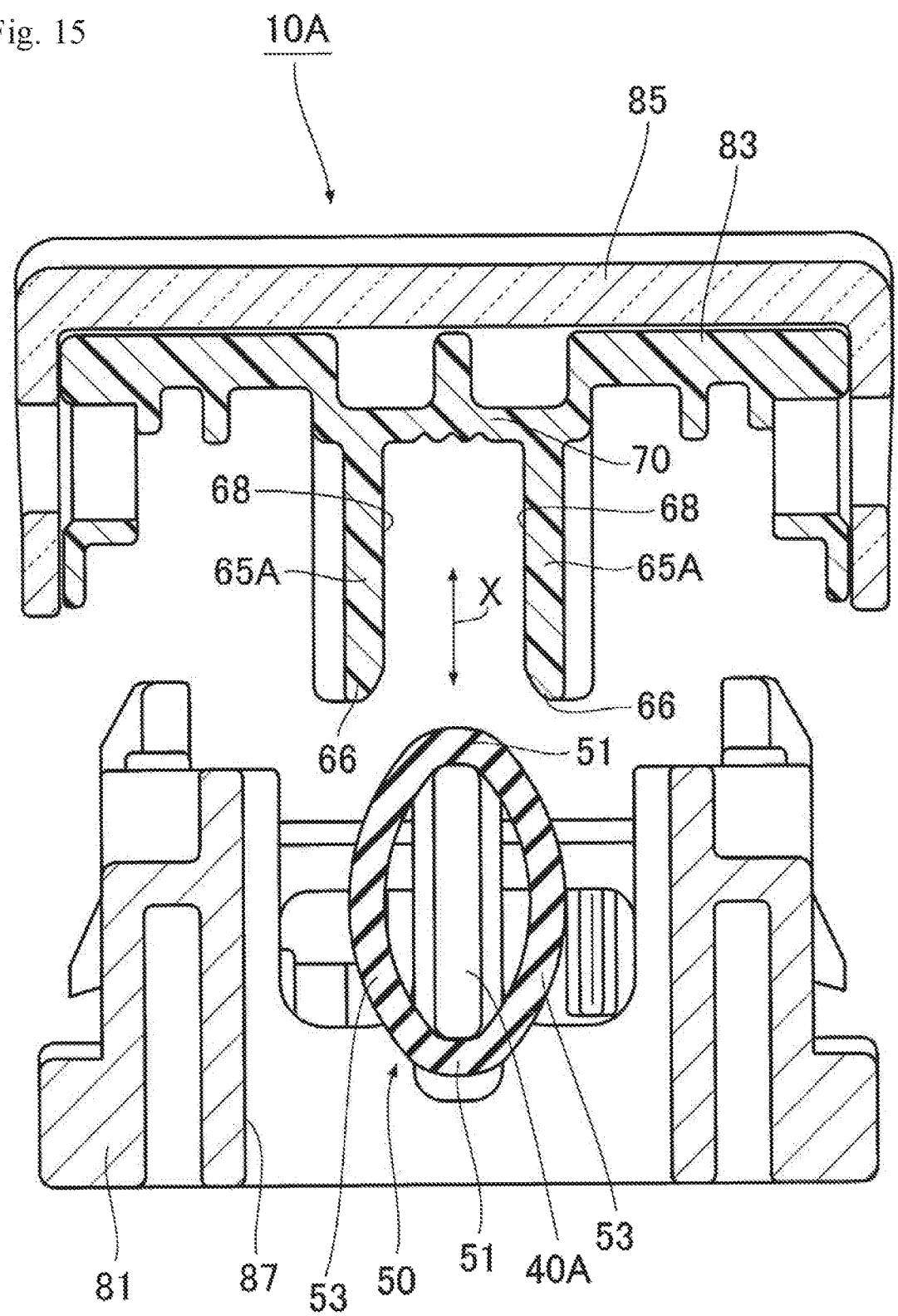
FIG. 15 illustrates a state where the damper device is in use, and is an explanatory view showing a state where the support section is not inserted between the pair of facing walls.
Figure 16:
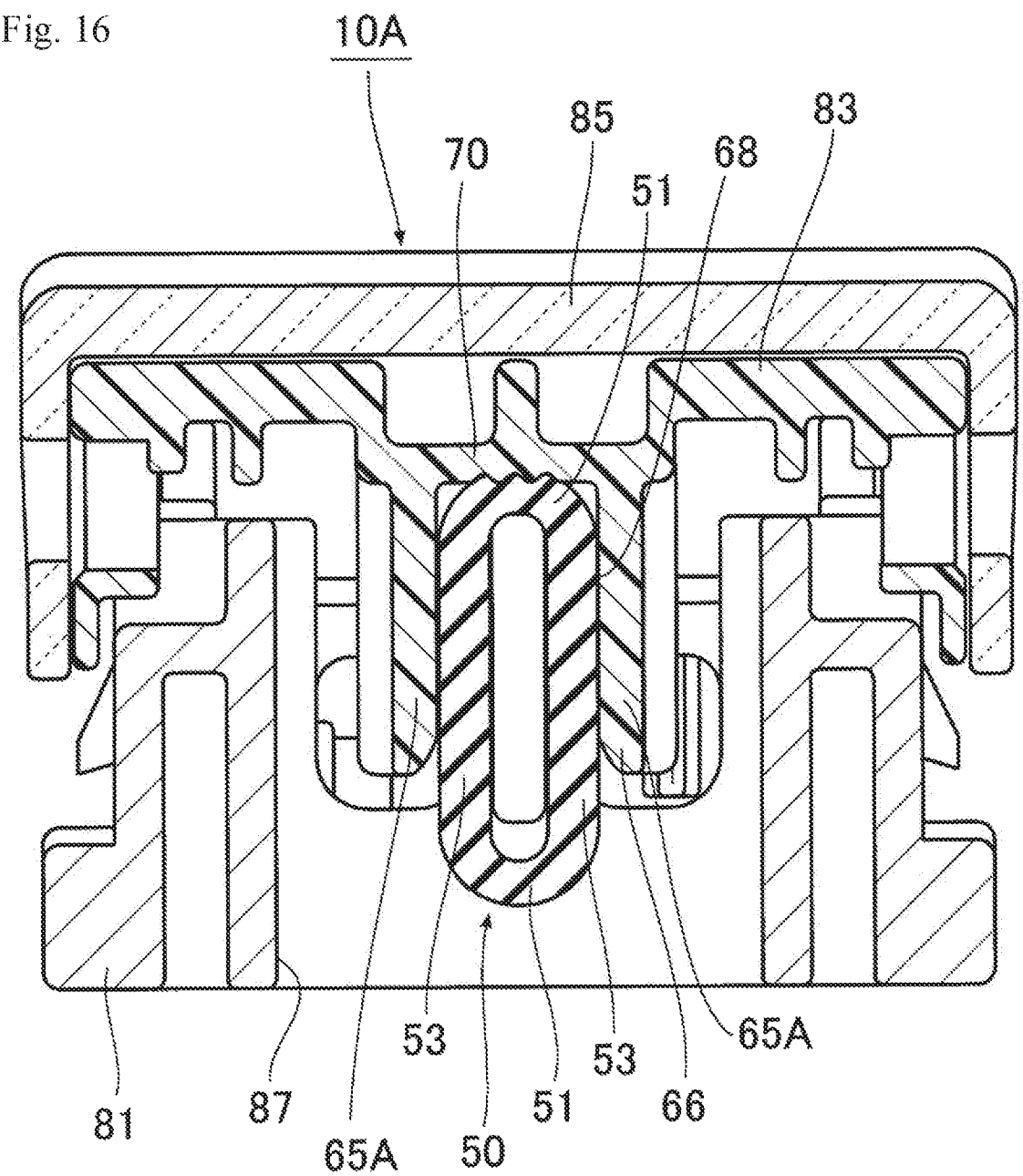
FIG. 16 illustrates the state where the damper device is in use, and is an explanatory view showing a state where the support section is inserted between the pair of facing walls.

As shown in FIGS. 13 and 15, a wall portion on the other longitudinal end side of the case 81 is provided with a notch portion 87, and a support section 40A for supporting the annular elastic member 50 protrudes in the notch portion 87 in a direction perpendicular to a bottom surface of the case 81.

Figure 14:
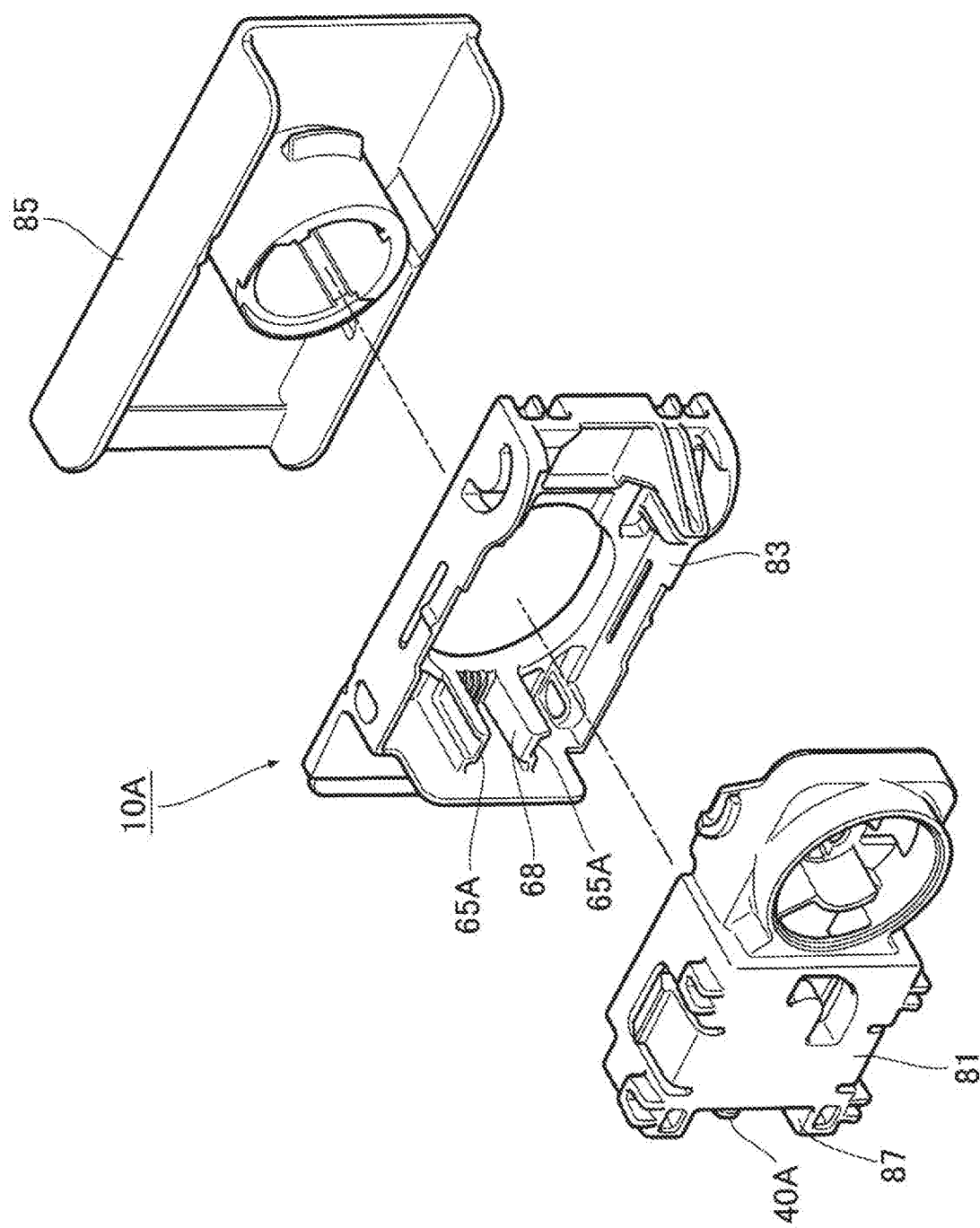
FIG. 14 is an exploded perspective view of the damper device when viewed from a direction different from that of FIG. 13.

On the other hand, the operation lever 83 has a shape elongated in one direction in conformity with the case 81, and has one longitudinal end rotatably supported on the one longitudinal end side of the case 81. When the damper device 10A is mounted on the front side of an opening/closing body (not shown), the operation lever 83 can move toward or away from a surface direction of the opening/closing body. As shown in FIG. 14, a pair of facing walls 65A, 65A extending parallel to each other are provided on the other longitudinal end side of the operation lever 83 and from a back surface side thereof (a surface facing the case 81). The inner surfaces 68, 68, which face each other, of the pair of facing walls 65A, 65A are also parallel to each other (see FIG. 15). The operating lever 83 is rotationally urged by an urging means such as a torsion spring (not shown) such that the other longitudinal end thereof moves away from the other longitudinal end of the case 81.

In the damper device 10A, normally, the operation lever 83 is rotationally urged by the urging means (not shown), and as shown in FIG. 15, the support section 40A comes out from between the pair of facing walls 65A, 65A. When the operating lever 83 is pushed in against the urging force of the urging means (not shown) from this state, the support section 40A is inserted between the tip ends 66, 66 of the pair of facing walls 65A, 65A, so that the separated portions 53, 53 of the annular elastic member 50 are pushed by the tip ends 66, 66 of the pair of facing walls 65A, 65A so as to be bent and deformed in a narrowed manner, and then pressed against the inner surfaces 68, 68 of the pair of facing walls 65A, 65A. Thereby, a damping force can be applied to the operating lever 83. Further, when the operation on the operation lever 83 is released from the state shown in FIG. 16, the annular elastic member 50 gradually comes out from the tip ends 66, 66 of the pair of facing walls 65A, 65A. At this time as well, the inner surfaces 68, 68 of the pair of facing walls 65A, 65A are pressed against the outer peripheries of the separated portions 53, 53 of the annular elastic member 50. Therefore, the damping force can be applied to the operation lever 83. Therefore, it is possible to suppress the hammering sound during rotation of the operation lever 83.

In this embodiment, the case 81 forms the "one member" among the pair of members according to the present invention, and operation lever 83 forms "the other member" among the pair of members according to the present invention.

Further, in the damper device 10A according to this embodiment, the one member and the other member are rotatable relative to each other. Therefore, for example, as described above, the damper device 10A can be applied to an operation member including a case and an operation lever or an opening/closing structure such as a glove box and a lid in a lock device.

The damper device 10A according to the above embodiment is an operation member including the case 81 and the operation lever 83 rotatably attached thereto, but the operation member may also be, for example, a rotary knob or a rotary handle that rotates along the surface direction of an opening/closing body or a fixed body, or a push type that is pushed in the surface direction, without being particularly limited.

The present invention is not limited to the embodiments described above and various modified embodiments are possible within the scope of the present invention; such embodiments are also included in the scope of the present invention.

REFERENCE SIGNS LIST

10, 10A damper device
20 slide rod (rod)
25 base member
28 rotation member
34 urging spring
40, 40A support section
41 one end
42 other end
43, 44 flange portion
50 annular elastic member
51, 51 contact portion
53, 53 separated portion
60 holding member
61 wall portion
61a insertion hole
65, 65A facing wall
66 tip end
67 base end
68 inner surface
70 stopper wall
80 operation member
81 case
83 operation lever
85 cover

The invention claimed is:

1. A damper device configured to apply a damping force when a pair of members move relative to each other, the damper device comprising an annular elastic member made of an elastic resin material,
    wherein one member of the pair of members is provided with a support section for supporting the annular elastic member,
    wherein an other member of the pair of members is provided with a pair of facing walls between which the support section is to be inserted when the pair of members move relative to each other,
    wherein the annular elastic member is mounted on an outer periphery of the support section, and in a mounted state, portions of an inner periphery of the annular elastic member, the portions facing each other in a movement direction of the one member or the other member, form contact portions that are in contact with the outer periphery of the support section, and portions of the inner periphery of the annular elastic member, the portions facing each other in a direction perpendicular to the movement direction, are provided with separated portions each of which connects the contact portions and that are separated from the outer periphery of the support section, and
    wherein in a state where the annular elastic member is mounted on the outer periphery of the support section, a maximum distance A of the separated portions facing each other is greater than an opening width B between tip ends of the pair of facing walls on a side on which the support section enters.

2. The damper device according to claim 1,
    wherein a base end side opposite to the tip ends of the pair of facing walls is provided with a stopper wall, and
    wherein when the pair of members move relative to each other so that the support section is inserted between the pair of facing walls and the annular elastic member comes into contact with the stopper wall, at least a part of the inner periphery of the annular elastic member in the separated portions comes into contact with the outer periphery of the support section.

3. The damper device according to claim 2,
    wherein inner surfaces of the pair of facing walls, the inner surfaces facing each other, are provided so as to have a wider width on the tip end side and have a narrower width on the base end side.

4. The damper device according to claim 2,
    wherein the support section is provided with flange portions that can be engaged with a side surface of the annular elastic member respectively at both ends in the movement direction, and one of the flange portions on an insertion direction side toward the pair of facing walls is provided so as not to protrude from the contact portions of the annular elastic member mounted on the support section.

5. The damper device according to claim 1,
    wherein the pair of members are configured such that the one member and the other member are rotatable relative to each other.

6. The damper device according to claim 1,
wherein when the annular elastic member is mounted on the support section and before the pair of members move relative to each other, the annular elastic member is in contact with the inner surfaces of the tip ends of the pair of facing walls while maintaining the separated portions.

7. A damper device configured to apply a damping force when a pair of members move relative to each other, the damper device comprising an annular elastic member made of an elastic resin material,
wherein one member of the pair of members is provided with a support section for supporting the annular elastic member,
wherein an other member of the pair of members is provided with a pair of facing walls between which the support section is to be inserted when the pair of members move relative to each other,
wherein the annular elastic member is mounted on an outer periphery of the support section, and in a mounted state, portions of an inner periphery of the annular elastic member, the portions facing each other in a movement direction of the one member or the other member, form contact portions that are in contact with the outer periphery of the support section, and portions of the inner periphery of the annular elastic member, the portions facing each other in a direction perpendicular to the movement direction, are provided with separated portions that are separated from the outer periphery of the support section,
wherein in a state where the annular elastic member is mounted on the outer periphery of the support section, a maximum distance A of the separated portions facing each other is greater than an opening width B between tip ends of the pair of facing walls on a side on which the support section enters, and
wherein the annular elastic member has a circular shape in a state before being mounted on the support section.

8. A damper device configured to apply a damping force when a pair of members move relative to each other, the damper device comprising an annular elastic member made of an elastic resin material,
wherein one member of the pair of members is provided with a support section for supporting the annular elastic member,
wherein an other member of the pair of members is provided with a pair of facing walls between which the support section is to be inserted when the pair of members move relative to each other,
wherein the annular elastic member is mounted on an outer periphery of the support section, and in a mounted state, portions of an inner periphery of the annular elastic member, the portions facing each other in a movement direction of the one member or the other member, form contact portions that are in contact with the outer periphery of the support section, and portions of the inner periphery of the annular elastic member, the portions facing each other in a direction perpendicular to the movement direction, are provided with separated portions that are separated from the outer periphery of the support section,
wherein in a state where the annular elastic member is mounted on the outer periphery of the support section, a maximum distance A of the separated portions facing each other is greater than an opening width B between tip ends of the pair of facing walls on a side on which the support section enters,
wherein the one member is a slide rod configured to slide in a predetermined direction, and the other member is a holding member that holds the slide rod in a slidable manner, and
wherein the holding member is provided with a wall portion having an insertion hole into which the slide rod is inserted, and the pair of facing walls are integrally formed with the wall portion.

* * * * *